United States Patent [19]

Landrum, Jr. et al.

[11] 4,344,158

[45] Aug. 10, 1982

[54] NOISE-SUPPRESSION METHOD

[75] Inventors: Ralph A. Landrum, Jr.; Juan B. Vallhonrat; Paul M. Perry, all of Houston, Tex.

[73] Assignee: Western Geophysical Co. of America, Houston, Tex.

[21] Appl. No.: 223,447

[22] Filed: Jan. 8, 1981

Related U.S. Application Data

[63] Continuation of Ser. No. 34,093, Apr. 27, 1979, abandoned.

[51] Int. Cl.$^3$ ............................................. G01V 1/36
[52] U.S. Cl. ....................................... 367/73; 367/47; 364/421; 364/517
[58] Field of Search .................. 367/42, 47, 63, 65–67, 367/73; 364/421, 514, 517

[56] References Cited

U.S. PATENT DOCUMENTS

| | | | |
|---|---|---|---|
| 3,495,081 | 2/1970 | Mensa | 364/517 |
| 3,496,528 | 2/1970 | Brey | 367/47 |
| 3,496,529 | 2/1970 | Ansley et al. | 367/40 |
| 3,828,262 | 8/1974 | Trocqueme | 367/66 |
| 3,894,222 | 7/1975 | Siems | 364/574 |
| 3,924,260 | 12/1975 | Braham et al. | 367/67 |
| 3,927,309 | 12/1975 | Fujiwara et al. | 364/574 |
| 4,054,786 | 10/1977 | Vincent | 364/575 |
| 4,064,480 | 12/1977 | Howlett | 367/67 |
| 4,099,075 | 7/1978 | Goldberg et al. | 364/517 |

*Primary Examiner*—Nelson Moskowitz
*Attorney, Agent, or Firm*—William A. Knox

[57] ABSTRACT

A method is disclosed for improving the signal-to-noise ratio of low level seismic signals resulting from weak acoustic sources. The method has application to the summation of signals from swept-frequency sources. A reference model of the level of a valid seismic signal is built for each of a number of time windows during a seismic-data recording cycle. The model is selected by obtaining the average of the absolute magnitudes for each time window from a number of sweeps to form a set of averages. The median of each set is selected and is padded by a suitable coefficient to provide the reference model for each time window. Subsequently, a normal recording is made. Each data sample amplitude of the recording is compared with the reference model corresponding to the time window that includes the data sample. If the amplitude level of the data sample exceeds the reference model level, that sample is suppressed prior to summing.

12 Claims, 4 Drawing Figures

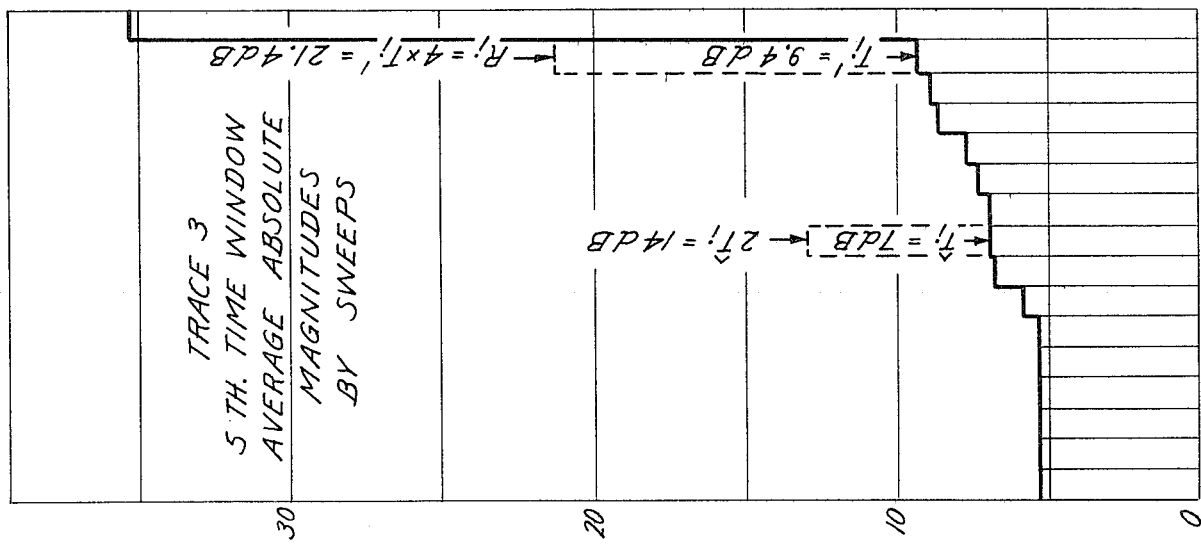

NOISE-SUPPRESSION METHOD

This application is a continuation, of application Ser. No. 034,093, filed Apr. 27, 1979.

BACKGROUND OF THE INVENTION

1. Field of the Invention

This invention relates to the technique of suppressing noise from a number of noisy low-level signals to attain a higher-level signal to noise ratio prior to summing.

2. Description of the Prior Art

Seismic exploration operations are frequently conducted using surface-coupled acoustic sources whose energy output is relatively weak. Two typical methods involve either weight dropping or injection of a swept-frequency chirp signal or "sweep" into the ground. Other methods involving weak impulsive sources are known such as pneumatic sources and exploding-gas guns. Seismic energy from the sources are received by detectors and are recorded by suitable equipment as time scale recordings.

Using swept-frequency sources as an example, it is customary to inject into the ground a number of sweeps such as 16. Received signals from the various sweeps are then summed. the received swept-frequency signals are plagued with non-source generated spectrally-overlapping noises. The unwanted noises have amplitude spectra that fall within the spectrum of the swept-frequency signal itself. The unique phase spectrum of the swept-frequency signal provides some degree of phase discrimination against the noise when several sweeps are summed. Additionally, the noise tends to have a random occurrence from sweep to sweep so that during summing some benefit is derived from random noise cancellation. But the amplitude of the noise signals may be many orders of magnitude greater than that of the desired signal so that adequate noise rejection cannot be achieved by phase discrimination alone after summing several sweeps.

The undesired noise may consist of random, short-duration spikes a few milliseconds long, such as might be generated by footfalls of man or beast. Or the noise may take the form of wave trains of several seconds produced by vehicular or aerial traffic near the detectors. It is necessary that a noise-suppression method be able to recognize and reject both short-duration and long-duration noise without excessive rejection of desired seismic signals.

In the past, a number of methods were practiced to suppress or reject high-amplitude noise prior to summing. Before the advent of digital recording, analog data were recorded on magnetic tape. Increasingly large noise signals gradually saturated the magnetic tape thereby imparting a soft clipping action to over-scaled signals.

Early binary-gain ranging digital recording systems were designed to maintain the signal level within certain limits such as between one eighth and one quarter of full scale. Such systems had a fast clamp rate such as 6000 dB/second but a slow release rate such as 200 dB/second. In effect, a digital AGC was provided. Further AGC action was achieved by summing only the mantissas of the data samples; the gain code was suppressed. As with analog recording, high-level noise signals were maintained within tolerable limits. One such binary gain system is described in U.S. Pat. No. 3,525,948 to Sherer et al. The problem of summing data from several records that have been subjected to AGC action is that the seismic signals are not necessarily displayed in their true relative amplitude relationship.

Another noise-blocking method is disclosed in U.S. Pat. No. 3,744,019 to Schmitt, assigned to the assignee of this invention. Schmitt provides a manually-set threshold selector so that signals that exceed a specified level are attenuated or clipped. Since the amplitude threshold is operator-selectable, much depends upon the judgement of the operator. Once set, the threshold selector is unable to cope with changing noise conditions as a function of time during the recording period of 15 to 20 seconds for any one sweep nor is it always practical from an operating standpoint to change the threshold setting between sweeps.

A method in common use with modern instantaneous floating point (IFP) recording systems is the so-called diversity summing or, alternatively, diversity averaging technique. Diversity averaging does not attempt to estimate the signal level. It assumes that the signal level is the same for corresponding times on all sweeps for each channel and that noises have random occurrences (that is, diversity) on the ensemble. Diversity averaging is sensitive to short-term impulsive transients and requires some sort of de-spiker to suppress such transients. A method of diversity stacking is disclosed in U.S. Pat. No. 3,398,396 to Embree.

Another recent noise-blocking method is disclosed in U.S. Pat. No. 3,924,260 to Braham and Kiowski. In this system, model or reference gain factors are determined individually for corresponding time increments on a per-channel basis. The gain factors associated with incoming normalized seismic data samples are compared to the reference gain factor. When a predetermined difference between the incoming and reference gain factors is exceeded, the incoming signal is assumed to be undesired noise and the signal is rejected. The noise rejection feature extends for an adjustable desired time interval to insure that the entire envelope of the objectional noise signal is rejected. If the observed gain factor of the incoming signal falls within a 2:1 ratio of the reference gain factor, the reference gain factor may be updated to equal the observed gain factor.

The system of Braham et al. has an advantage over earlier systems in that the reference gain factor may be updated to fit the changing conditions that are necessarily encountered during the course of a survey. There are certain disadvantages however. The reference gain factor is generated by examining the normalized gain for each sample within an incremental time window. Whenever the normalized gain of a subsequent sample is less than the gain of a previous sample, the lower gain of the subsequent sample becomes the reference gain. Clearly, in the presence of high-amplitude noise, during an initialization period, the reference gain factor is driven to the minimum gain that is associated with the highest-amplitude sample which may in fact be noise. The system is, therefore unduly sensitive to extremes of noise signal levels.

SUMMARY OF THE INVENTION

It is an object of this invention to provide a noise blocking method and apparatus for use with weak seismic signals which are received by a multichannel data acquisition system that is adaptive to changing field conditions and that is insensitive to extreme-valued signal samples.

In an aspect of this invention, at a desired location a number of time-scale seismic signal recordings are made as the result of several sweeps of one or more chirp-signal generators as they move through a source point. Each time-scale recording is divided into a series of consecutive time windows, each having a desired length. The average absolute magnitude of the samples is determined within corresponding time windows of the respective recordings. For each time window there is, therefore, a set of average absolute signal values equal in number to the number of time-scale recordings that resulted from the respective sweeps. The median value of each set is selected and that value is doubled. The largest average absolute signal level within each set, that lies between the limits formed by the median value and twice the median value, is chosen. The chosen value is multiplied by an operator-selected coefficient equal to a non-zero power of 2. The product is the reference model for the corresponding time window. Different reference models may be created for each channel of the data acquisition system.

In another aspect of this invention, the coefficient is equal to 2 in order to compensate for the fact that the average of an oscillatory signal train is 0.6 times the peak values.

In another aspect of this invention the coefficient is equal to $4 = 2^2$ to additionally allow for normal 2:1 changes in the level of desired seismic signals.

Seismic chirp signals are generated at other locations. Each incoming received seismic data sample is compared with the reference model appropriate for the time window embracing the data sample. If the received data sample exceeds the reference model it is rejected as noise. Otherwise the received data sample is accepted as a valid datum.

In one preferred embodiment of this invention, if the amplitude of a received data sample exceeds the value of the reference model, that sample plus a predetermined number of subsequent samples are rejected.

In another embodiment of this invention, means are provided for updating the reference model at a new desired location simultaneously with the application of the previous model to data being currently recorded.

BRIEF DESCRIPTION OF THE DRAWINGS

The features and objects of this invention will be better understood by reference to the accompanying detailed description and drawings wherein:

FIG. 3 is a numerical example illustrating operation of the median selector of FIG. 2;

FIG. 4 is a graph showing the method of determining the signal-level reference model;

DETAILED DESCRIPTION OF THE PREFERRED EMBODIMENT

The basic principles of seismic exploration, wherein swept-frequency signals, hereinafter termed sweeps, are injected into the ground and the resulting reflected signals are later received and recorded by a multichannel data acquisition system, are well known. These principles have been described in a plethora of patents including not only those cited supra but also for example, in U.S. Pat. No. 2,688,124 to Doty et al and U.S. Pat. No. 2,981,928 to Crawford et al. A signal summation technique is described in U.S. Pat. No. 3,065,453 to Doty. Accordingly in the interest of brevity the well-known basic principles need not be discussed.

As pointed out above, in this invention, a reference model of the expected level of incoming seismic signals is generated for each of a number of consecutive time windows during a data recording cycle. The model is generated on a per-channel basis. After a set of reference models has been determined for corresponding consecutive time windows of the respective data channels, the appropriate model is compared with each received data sample. If the data sample exceeds the amplitude level of the model, that sample is rejected as noise. Otherwise the sample is accepted as a valid signal.

Figure 1:
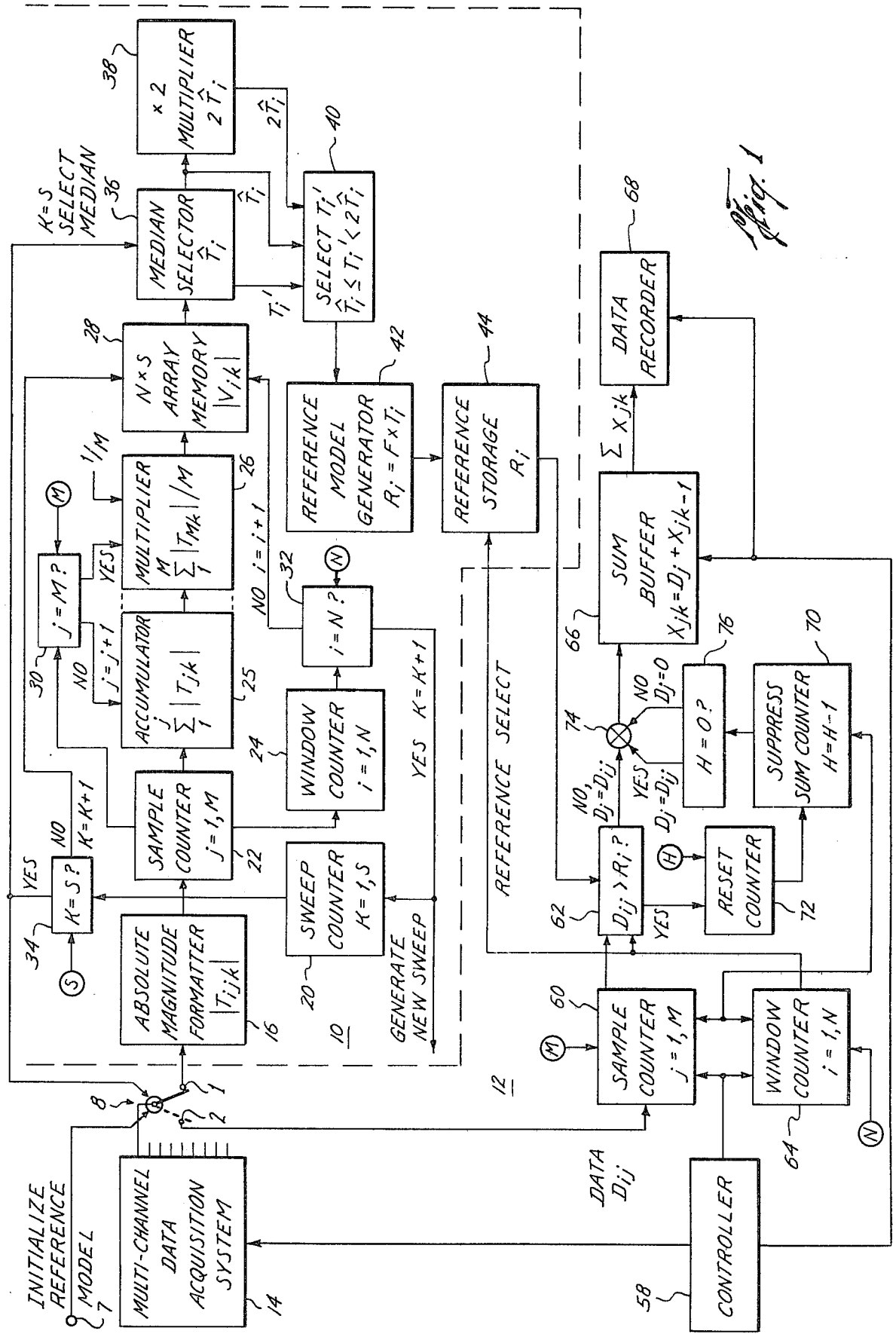
FIG. 1 is a block diagram of a preferred noise-suppressing circuit used in association with a multichannel recording system.

FIG. 1 is a block diagram of a preferred noise suppression system. It is shown divided into two circuit sections, separated by dot-dashed lines. The upper part 10 slows the circuitry used to generate or build a reference model of the level of expected seismic signals from a number of sweeps. The lower part 12 shows means for comparing the reference model with incoming seismic signal samples during a normal recording cycle. Multichannel recording system 14 is common to both circuit sections and may be switched to one or the other through switch 8 or to both if desired. Details of only one channel are shown since all other channels are duplicated. For purposes of illustration a model-building cycle will be described separately from a normal recording cycle.

The reference model is advantageously generated or built, at least initially, prior to the normal seismic data acquisition and recording operation. Since reference-model generation may be but is not necessarily an automatic function of a normal recording operation, model generation may be operator-initialized such as by means of a pushbutton 7 which sets switch 8 to position 1, thereby connecting recording system 14 to circuit section 10. A model-building cycle could, of course, be initiated automatically if desired at a plurality of different locations.

For purposes of illustration but not by way of restriction, let the record length including sweep length and listening time per recording cycle be 16.384 seconds, let each time window be 1,024 milliseconds long, and 16 sweeps will be assumed. Accordingly, there will be 16 time windows per recording cycle and 16 recording cycles. The numbers 16 and 1,024 were chosen because they are convenient powers of two; any other arbitrary time division based on any desired number system could be used. Assuming that the incoming data are sampled at two-millisecond (ms) intervals, there will be 512 data samples per time window and a total of 8192 data samples per recording cycle.

The signal level of the data samples provided by the data acquisition system may be expressed in some floating-point format or as a data word represented by any of the many fixed-point formats, for example magnitude plus sign. Hereinafter, for brevity, the term "data sample" will mean the amplitude level of a sample of data expressed as a binary integer. Assuming the signed data samples are expressed in magnitude plus sign format, they are converted to absolute magnitudes in absolute magnitude formatter 16 by discarding the sign bit of the sample. This process can be done by various well known methods which are dependent on the number notation used. From absolute magnitude formatter 16, samples are directed to sample counter 22.

A sweep counter 20, sample counter 22 and window counter 24 are provided. These counters are conveniently Am74IS169 four-bit up-down counters made by Advanced Micro Devices. The counters are cascadable to provide the total number of bits needed for a particular count range. The number of sweep, S, the number of samples per window, M, and the number of windows, N, are operator-selectable and are entered into each counter by any convenient means such as digital thumbwheels, for example, of any well known type. In the exemplary system, $S=16$, $M=512$ and $N=16$. In operation, sample counter 22 increments its count each time a sample arrives from absolute magnitude formatter 16. When the count, M reaches 512, the counter sends a carry bit to window counter 24 to increment the counter by one count. Counter 22 then commences sample counting anew. When the count in window counter 24 reaches $N=16$, a carry bit is transmitted to sweep counter 20, incrementing that counter by one count, and causing a new sweep to be generated by well known means (not shown).

Sample Counter 22 transmits each sample to accumulator-multiplier 25, 26. Accumulator-multiplier 25, 26 may be in practice a single device such as the multifunction arithmetic unit TDC1003J made by TRW of Redondo Beach, which consists of an accumulator section 25 and a multiplier section 26. When all of the $M=512$ data samples for a given sweep and time-window have been accumulated, the accumulated sum then is the sum of the absolute magnitudes of a block of data samples for the ith time window of the kth sweep. When the count for sample counter 22 is exhausted, the accumulated sum is fed from accumulator section 25 to one multiplier input of multiplier section 26. The reciprocal of the number of samples $1/M=1/512$ is applied to the other multiplier input thereby to calculate the average absolute magnitude, $|V_{ik}|$, for the ith time window and the kth sweep.

Alternatively, assuming pure binary notation, a shift register could be substituted for multiplier 26. Division could be accomplished by simply applying the requisite number of right shifts to the data bits, nine shifts in the case of 512 samples. $|V_{ik}|$ is stored in an $N \times S$ array memory 28. In the exemplary system, since there are 16 sweeps and 16 time windows per sweep, array 28 must have a capacity of 256 locations. Register 28 may be a random access memory of any well known type.

Comparators 30, 32, 34 determine the point at which the count becomes exhausted in counters 22, 24, 26 respectively as a function of sample number, window number and sweep number. The comparators are loaded with the operator-entered constants M, N and S. Any well known comparator may be used such as an SN 7485 made by Texas Instruments Inc. of Dallas, TX. When comparator 30 sees that a sufficient number of samples have been accumulated in accumulator 25; it causes the sum to be divided by M, the number of samples, as explained supra, to obtain the average absolute magnitude $|V_{ik}|$ of the samples. Comparator 32 increments running index i of the $|V_{ik}|$ for each time window. When the count in window counter 24 is exhausted, comparator 32 causes a new sweep to be generated. Comparator 34 increments running index k of the $|V_{ik}|$. When the required number of sweeps have been generated, comparator 34 initiates the computation of the reference model $P_i$ for the respective time windows in a manner next to be described. Comparator 34 also may reset the recording system to a normal recording operation by setting switch 8 from position 1 to position 2. Comparator 32 and 34 together determine the location addresses for the $|V_{ik}|$ in array memory 28.

Array memory 28 contains the average absolute magnitudes $|V_{ik}|$ arranged in a rectangular array in one dimension according to time window number and in the other dimension according to sweep number. After the desired number of sweeps, such as 16 has been generated, for every time window, there is a set of 16 average absolute magnitudes $|V_{ik}|$ resident in memory 28 arranged by sweep number. When the count in comparator 34 becomes exhausted, the comparator causes median selector 36 (to be described in detail infra in connection with FIGS. 2 and 3) to extract the median $\hat{T}_i$ from each set of $|V_{ik}|$ for every time window. For example, if there are 16 sweeps, the 9th value might be selected or the average between the 8th and 9th values could be chosen. The median rather than the arithmetic mean is used in order to avoid the influence of extreme values of $|V_{ik}|$ due to excessive noise associated with one or more of the sweeps. The median is then doubled in $\times 2$ multiplier 38 which is conveniently accomplished by a one-bit left shift in a shift register such as an Am25LS299, made by Advanced Micro Products. The values $\hat{T}_i$ from median selector 36 and $2\hat{T}_i$ from multiplier 38 become two limiting values. The largest value of $T_i'$ from a set of $|V_{ik}|$ stored in array memory 28 that satisfies the relation $\hat{T}_i \leq T_i' < 2\hat{T}_i$ is selected by comparator 40. Of course, some other multiple of the median could be used as an upper limit and some fraction of the median could be used as a lower limit.

The quantity $T_i'$, is augmented by a coefficient F. Coefficient F is a selected non-zero power of 2. It will be recalled that the average absolute magnitude of a train of oscillatory signals is equal to 0.6 times the peak value of that train. Accordingly, to avoid clipping peak values, the minimum value of F is $2^1$ or 2. It is reasonable to assume that valid seismic signals may have a 2:1 amplitude range. Hence to avoid possible suppression of valid data, F may prudently be increased to $2^2=4$. The product, $FT_i'$, is the reference model $R_i$ for the ith time window. The product $R_i$ is formed in reference generator 42, which also may be a shift register. $R_i$ is stored in a reference storage 44.

Median selector 36 will now be discussed in detail with reference to FIGS. 2 and 3. The average absolute magnitudes $|V_{ik}|$ are stored along the S coordinate of array memory 28, arranged by sweep number, but they are randomly ordered according to magnitude. Median selector 36 rearranges a set of average absolute magnitudes for each time window according to increasing numerical value and selects the mid-value of the set. The selector operates by comparing adjacent magnitudes such as $|V_{ik}|$ and $|V_{i,k+1}|$ and shifting the larger of the two magnitudes towards that end of a register which is designated as the most significant magnitude location.

Figure 2:
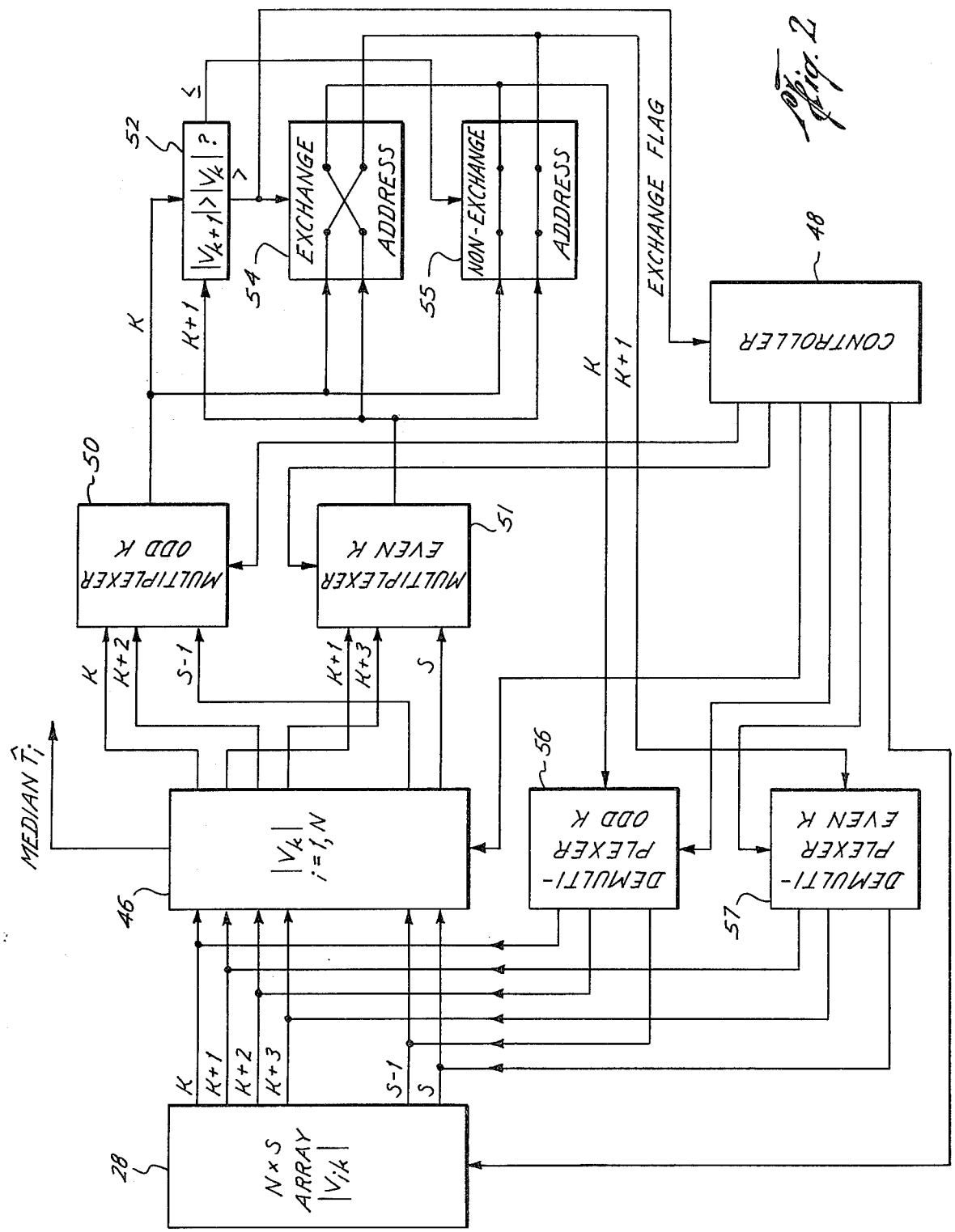
FIG. 2 is a block diagram of the details of the median selector of FIG. 1.

Referring to FIG. 2, a set of average absolute magnitudes for the first time window $i=1$ are shifted from array memory 28 into a holding register 46 under control of a controller 48. A pair of multiplexers 50, 51 is provided. Assuming that 16 sweeps per set are generated, each multiplexer is preferably an eight-line to one-line device such as a TISN74152 unit. All of the odd-numbered output lines k, k+2,-, S−1 from holding register 46 are connected in sequence to the inputs of multiplexer 50; all of the even numbered lines k+1, k+3,–, S (where S in this case is 16) are connected to multiplexer 51. Upon command from controller 48, the average absolute magnitudes from adjacent locations in holding register 46, are strobed over lines k and k+1 to comparator 52 by multiplexers 50, 51. If $|V_{i,k+1}|$ is larger than $|V_{ik}|$, comparator 52 activates an exchange address switch 54, thereby applying the larger value, $|V_{i,k+1}|$ to line k and the smaller value $|V_{ik}|$ to line k+1. If $|V_{i,k+1}|$ is less than $|V_{ik}|$, the addresses for the respective average absolute magnitudes remain unchanged because non-exchange address switch 55 is closed and exchange switch 54 is open. Following the compare cycle, controller 48 causes demultiplexers 56, 57 such as a TISN74155, to reenter the two compared values into holding register 46. In a second compare cycle, the values $|V_{i,k+1}|$ and $|V_{i,k+2}|$ are compared, their addresses interchanged if $|V_{i,k+1}|$ is greater than $|V_{i,k+2}|$, and are replaced in holding register 46. Additional compare cycles are accomplished for $|V_{i,k+2}|$, $|V_{i,k+3}|$ etc., to $|V_{i,S-1}|$ and $|V_{iS}|$, the last two values stored in holding register 46. Whenever an address interchange is indicated by comparator 52, an exchange flag is set in controller 48. The presence of an exchange flag tells the controller to reiterate another compare cycle because all of the data values in the set may not yet have been properly arranged during the previous pass. During each compare-cycle iteration, the larger values for $|V_{ik}|$ will migrate towards a designated end of holding register 46. Compare-cycle iteration will cease when the exchange flag is turned off.

FIG. 3 is a numerical example (using only 6 values for brevity) illustrating the iteration process. The average absolute magnitudes $|V_{ik}|$ were originally ordered in holding register 46 as shown in the Iteration 1 column. During the first comparison the system looks at the values 10 and 53, finds that 53 is the larger value and replaces the values in register 46 after interchanging addresses. On the second compare cycle, 18 is compared with 46 and again an address interchange occurs. Continuing the process, by the fifth compare cycle of the first iteration, the value 10 has migrated to the lowest-order position. The new arrangement of the $|V_{ik}|$ is shown in the Iteration 2 column. Compare-cycle iterations are continued and by the fifth iteration, the $|V_{ik}|$ are rearranged in the desired order.

Referring back to FIG. 2, after the average absolute magnitudes are arranged in the desired order, the exchange flag is turned off telling controller 48 to stop iterating. At the same time, a command issues to holding register 46 to transmit the median $\hat{T}_i$ to ×2 shift register 38.

The operation of reference-model building is illustrated graphically in FIG. 4. Here the average absolute magnitudes for a set of 16 sweeps in the 5th time window of the 3rd data channel have been plotted as a histogram in terms of decibels (dB) referred to as arbitrary reference of 7.8 millivolts. As is evident, the magnitudes have been arranged in ascending order and the median is 7.0 dB. The median is increased by 6 dB (doubled) as shown by the dashed lines. The largest average absolute magnitude of the set that lies between the limits of 7 dB and 18 dB is the fifteenth entry or 9.4 dB. This magnitude is multiplied by a coefficient of 4 (12 dB added) to provide a reference model of 21.4 dB. Choice of the median as a reference eliminates the influence of one or more extreme magnitudes such as the 16th which is over 35 dB, or more than ten times the level of the other fifteen magnitudes.

The preferred operation of the noise-suppression capability is best explained by referring back to FIG. 1. During the model building operation, switch 8 is set to contact 2 so that incoming data from the seismic data acquisition system is diverted to circuitry 10 until the desired $R_i$ have been created. For normal recording of data as will now be discussed, switch 8 is reset to position 1 as shown by the dashed lines. Switch 8 may also be reset automatically by comparator 34 when the count in sweep counter 20 is exhausted.

A controller 58 controls sequencing of operations in data processing circuitry 12. Although controller 58 is shown as a separate item, it is actually a part of the multichannel recording system 14 itself. The incoming data samples $D_{ij}$ pass through sample counter 60 to comparator 62. Assuming a 2-ms data sampling rate and 1024 millisecond time windows as before, each time window will include M=512 samples. Each time the count in sample counter 60 is exhausted, window counter 64 is incremented by one count and sample counter 60 is reset to begin a new count. Window counter 64 selects the proper reference model $P_i$ that corresponds to the time window within which each sample line. Sample counter 60 and window counter 64 further increment the respective running indices j and i that determine the address to which each sample is to be directed in the sum buffer 66.

Each incoming sample $D_{ij}$ is compared to an appropriate reference model $P_i$ in comparator 62. If the sample value exceeds the reference model value, that sample value is considered to be noise and is set to zero. If the sample is less than or equal to the reference model, it is considered to be a valid datum and is summed with previous corresponding data values in sum buffer 66. Data from sum buffer 66 are then recorded on a data recorder 68, which, along with sum buffer 66, may be an integral part of data acquisition system 14 or which may be stand-alone units.

In the above discussion, if a single datum exceeded the reference model, then only that single datum was suppressed or zeroed out. In some environments, it may be preferable to zero out not only the offending datum but also some desired number of subsequent data values, such as 4 or 8, a time-period equivalent to 8 to 16 ms at a 2-ms sample rate. For this purpose a suppress-sum counter 70 is provided. The integer H, represents the number of subsequent data samples that are to be suppressed following an offending datum. The constant is entered via an operator-input switch into a sum-suppress reset counter 72. Each time a datum $D_{ij}$ exceeds $P_i$, reset counter 72 resets suppress-sum counter 70 to H, the number of subsequent data samples to be suppressed. For each sample count thereafter, counter 70 is decremented by one count. A comparator 76 tests the value of the decremented count contained in counter 70. So long as the current decremented count value is non-zero, switch 74 is opened so that incoming data values are suppressed by setting them to zero when they are entered into sum buffer 16. When the count in counter 70 reaches zero, switch 74 is closed and incoming data values are now summed with their true values in sum buffer 66.

The suppress-sum counter logic provides certain advantages. By setting a limit on the number of subsequent samples to be suppressed, short term noise transients that are only a few milliseconds long are suppressed but the data beyond the transient remain unaffected. On the other hand, the sum-suppress reset circuit continuously holds the count in counter 70 to its maximum value in the presence of long-term noise. The above is true because every new excessively-large data sample reactivates sum-suppress reset 72 regardless of whether or not counter 70 was decremented to zero. Thus, short term spikes are suppressed without affecting closely-following valid data samples. Long-term noise on the other hand is suppressed for as long as it persists, but the system quickly recovers within but a few sample times after the long term noise ceases.

In the above discussion, sets of reference models $R_i$ were built and then one or more conventional seismic data recording cycles were conducted. In practice it is quite possible to do model building substantially concurrently with data summing and recording, such as when moving from one recording station to another. By that means, the operator is assured of a continuously updated signal reference model.

The particular routine for building selecting a signal reference model for each time window relative to the median value with respect to a set of sweeps, was empirically devised. Other methods, limits and cofficients could be chosen. For example, instead of determining the average absolute magnitudes of the data samples for each time window, the RMS (root mean square) value could be used. However, the method as disclosed is preferred because the operations of squaring, summing and extraction of the square root of a sum may be too time consuming for normal field operations.

The particular values assigned to the number of sweeps, samples per time window and time windows per recording cycle were selected by way of example and in no way limit the scope of this invention.

The particular circuitry illustrated in the drawings is exemplary only. Other arrangements and components may be used without departing from the scope and spirit of this invention which is limited only by the appended claims.

We claim as our invention:

1. A method for improving the signal-to-noise ratio of a train of received seismic signals comprising the steps of:
   (a) generating a plurality of seismic-signal time-scale recordings at a desired location;
   (b) separating each said time-scale recording into a series of consecutive time windows;
   (c) averaging the absolute amplitudes of the seismic signals within the corresponding time windows of the respective time-scale recordings thereby providing a set of averaged absolute amplitudes for each said time window;
   (d) choosing a desired one of the averaged absolute amplitudes from each said set;
   (e) augmenting the chosen averaged absolute amplitudes by a preselected coefficient thereby generating a reference-model of expected substantially noisless valid seismic signals within each said time window;
   (f) initiating a normal recording cycle to generate and receive a seismic signal train in response to an excitation of the earth at a first location;
   (g) comparing the amplitudes of signals from the received seismic signal train, embrased within consecutive time windows, with the corresponding reference-models; and
   (h) rejecting as noise spikes those offending signals in said seismic signal train whose amplitudes exceed the amplitude of the reference model.

2. The method as defined in claim 1 wherein such offending seismic signals and all subsequent seismic signals are suppressed for a predetermined time period following the onset of said offending seismic signals.

3. The method as defined in claim 1, wherein the amplitude level of said received seismic signal train is sampled at desired intervals to form a time-scale recording of digital data samples, including the further steps of:
   comparing each said data sample with a digital representation of the reference model corresponding to the time window encompassing said data sample; and
   suppressing offending data samples whose amplitude level exceeds the level of said reference model.

4. The method as defined in claim 3 wherein said offending data sample and a predetermined number of subsequent data samples are suppressed.

5. The improved noise suppression method as defined in claim 1 wherein the step of selecting includes the steps of:
   determining the median within each set of combined seismic signals; and
   selecting the largest average absolute magnitude within each set that lies between the limits of the median and a multiple of the median.

6. An improved apparatus for enhancing the signal-to-noise ratio of a train of seismic signals received by a recording system in response to an acoustic excitation of the earth, said recording system including means for sampling, quantizing formatting, summing and recording seismic signals received during normal recording cycles comprising:
   means for setting the recording system to initialize a first reference-model-building cycle at a first desired location including means for generating a plurality of seismic-signal time scale recordings in response to earth excitations at said first desired location;
   a sample counter for grouping the signals of each said time scale recording within a plurality of consecutive time windows;
   means for averaging the absolute amplitudes of the signals contained within each said time window of the respective time scale recordings to provide a set of average absolute amplitudes for each said time window;
   means for selecting a desired one of said averaged absolute amplitudes from each said set;
   means for multiplying the selected average absolute amplitudes by a predetermined coefficient to provide a reference model of the expected amplitude level of a valid seismic signal for each said time window;
   a storage for receiving said reference models;
   means for resetting said recording system to execute a normal recording cycle;
   means for comparing seismic signals received during said normal recording cycle with the stored reference models corresponding to respective time windows containing the received seismic signals; and
   means for rejecting, prior to summing, seismic signals whose amplitude level exceeds the reference-mode amplitude.

7. The apparatus as defined in claim 6 wherein said selecting means further comprises:
 means for selecting the median average absolute magnitude from each set; and
 means for selecting the largest average amplitude from eash said set that lies between the median and an integral multiple of the median.

8. An improved apparatus for enhancing the signal-to-noise ratio of a train of seismic signals received by a recording system in response to an acoustic excitation of the earth, said recording system including means for sampling, gain-conditioning, quantizing, summing and recording seismic signals received during normal recording cycles, comprising:
 an initialization switch for setting the recording system to initialize a first reference-model-building cycle at a desired location including means for generating a plurality of seismic-signal time scale recordings in response to earth excitations at said desired location;
 a formatter coupled to said recording system for converting said quantized signal samples to absolute values;
 a sample counter coupled to said formatter for receiving and grouping the signals of each said time scale recording within a plurality of consecutive time windows;
 an accumulator/multiplier for averaging the absolute amplitudes of signals received from said counter, contained within each said time window of the respective time scale recordings, to provide a set of average absolute amplitudes for each said time window;
 a selector for extracting a desired one of said averaged absolute amplitudes from each said set;
 a shift register for augmenting said extracted average absolute amplitude by a predetermined coefficient to provide a reference model of the expected amplitude level of a valid seismic signal for each said time window;
 a storage for receiving said reference models;
 a reset switch for resetting said recording system to execute a normal recording cycle;
 a comparator for comparing quantized seismic signal samples received during said normal recording cycle with the stored reference models corresponding to respective time windows containing the received seismic signals; and
 a suppress-sum counter for rejecting, prior to summing, quantized seismic signal samples whose amplitude level exceeds that of the reference-model.

9. The apparatus as defined in claim 6 wherein said recording system includes means for converting said received signals to digital data samples whose level is representative of the signal amplitude level, said apparatus further comprising:
 a comparator for comparing each said digital data sample with a digital representation of the level of the reference model that is appropriate to the time window including said sample;
 a suppress-sum counter, coupled to said comparator, for suppressing, prior to summing, offending samples whose level exceeds the reference model level.

10. The apparatus as defined in claim 9 further comprising:
 a sample counter interconnected with said comparator and said suppressing means for suppressing a desired number of data samples following an offending data sample.

11. The apparatus as defined in claim 1 further comprising:
 means for automatically initializing other reference-model-building cycles at other desired locations concurrently with a normal recording cycle.

12. The improved noise suppression method as defined in claim 1 wherein said preselected coefficient is a non-zero power of 2.

* * * * *